UNITED STATES PATENT OFFICE.

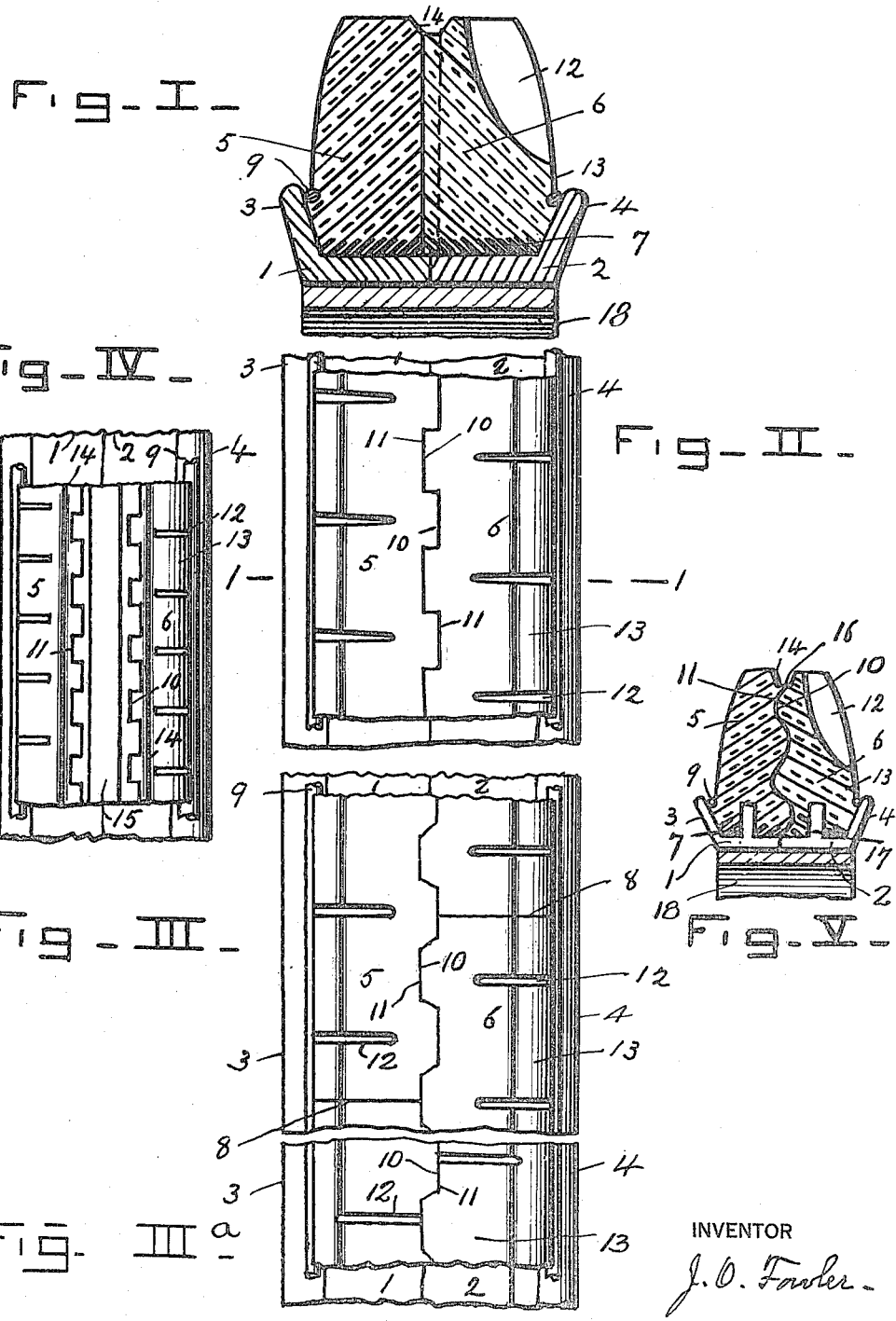
J. O. FOWLER.
TIRE FOR TRUCKS.
APPLICATION FILED MAY 25, 1918.
1,282,562.  Patented Oct. 22, 1918.
INVENTOR
J. O. Fowler

JONATHAN O. FOWLER, OF NEW YORK, N. Y.

TIRE FOR TRUCKS.

1,282,562.   Specification of Letters Patent.   Patented Oct. 22, 1918.

Application filed May 25, 1918. Serial No. 236,660.

*To all whom it may concern:*

Be it known that I, JONATHAN O. FOWLER, a citizen of the United States of America, and a resident of New York, in the county and State of New York, have invented a certain new and useful Tire for Trucks, of which the following is a specification, the same being a full, clear, and exact description of the invention, such as will enable others skilled in the art to which it appertains to make and use the same.

This invention relates to vehicle tires and to a novel and improved manner of equipping the same with devices to insure, maintain and increase the resilience and tractive properties of the same over what would otherwise be the case, and also to prevent the creeping and slipping of the tire; and it pertains in particular to the larger sizes commonly used for trucks and constructed of rubber or other suitable material (and termed by me herein as rubber) having devices which aid in forming a solid supporting bed at the tread thereof without undue lateral deflection, and wherein the lateral strain upon the rubber is diminished by the use of transverse pockets or laterally arranged recessed portions.

With the above objects in view, and others which will hereafter appear, the invention consists in the construction, arrangement and operation of parts herein set forth. In the drawings which accompany this specification, and in which one embodiment of the invention is illustrated, Figure 1 represents a view in section taken on the line 1—1, Fig. 2; Figs. 2 and 3 are plan views of articles constructed according to my invention, the peripheral groove being omitted for clearness of illustration. Fig. 3ª shows a part of a tire having recesses located at the center of the tread thereof, and Figs. 4 and 5 are respectively plan and sectional views of other embodiments of the invention.

Like numerals of reference indicate like parts in all the views.

Referring particularly to the drawings, it will be seen that the tire is preferably, and in fact ordinarily, supported and maintained in position by the channel structure which preferably consists of and comprises a plurality of rim sections or members, as 1 and 2, which may be of any approved or convenient construction such as is well known in the art and which are preferably provided with peripheral flanges, as 3 and 4, which rim sections may be attached to the felly 18 in the ordinary manner.

The said tire element, which is preferably of the twin type, is also preferably made in a plurality of parts each member or section, as 5 and 6, comprising when applied an endless ring or band or a plurality of tire sections of convenient length forming where assembled a continuous tire the base portions of which preferably comprise hard rubber or vulcanite material, as 7, which are ordinarily respectively vulcanized to the rim members 1 and 2 constituting the channel sections. Obviously, each of the tire members may be made of a single length or endless band which, when assembled and applied in abutting relation with the other tire member, shall form the entire circle of unitary construction, as indicated in Fig. 2, or else they may be, together with the channel sections if desired, built up of sections which when assembled on the wheel and applied in abutment, as shown at the line 8, Fig. 3, shall comprise the complete composite or sectional tire member.

If desired, a binding wire, as 9, such as commonly used, may be employed as auxiliary means to press the rubber firmly and to secure the tire members within the flanges of the channel rim, although, ordinarily, it is dispensed with, as the tire is securely held in position without the use of the same.

I provide means whereby the tire sections may be enabled to resist any undue stress or strain in various directions; first, by the rigid and uniform connection between the entire inner periphery of each of tire elements and the whole outer face of the channel section to which it is vulcanized to prevent creeping; second, by constructing the tire members at their meeting faces with interlocking projections and recessed portions, as 10 and 11, for mutual protection and support and to hold the said meeting faces together rigidly and to prevent any slipping of one on the other which parts may be right-angled, convex, or concave; third, by forming each tire section so as to comprise flaring as in Fig. 2 or parallel sided as in Fig. 3 transverse pockets or recessed portions 12 and intermediate blocks or webs 13; and fourth, by forming the tire sections so that there shall be an outer peripherally arranged groove 14 between the two, which groove may open up when the tire tends to slide to resist the side movement of the latter.

It will thus be seen that instead of the ordinary convex face I provide the tire with a flat tread portion having a central valley or groove, the faces of the bands at this point being inclined away from each other, the width of the tread between the grooves of the sections when under pressure preventing the tire from cutting in or burying itself in sandy roads. The series of yielding pockets or recesses which may face the central plane of the wheel as indicated in Fig. 3ª are spaced a distance apart longitudinally and they may be staggered in position, whereby slipping is prevented and the resilience and tractive function of the tire increased, as by this arrangement the rubber under compression will flow equally in all directions, the strength of the body of the tire being maintained constant by the longitudinally disposed web.

I provide means for resisting longitudinal stress of the twin tire, which although comprising a plurality of bands as 5, 15 and 6 in Fig. 4 resembles only a single tire, in addition to the vulcanization of the same on the rim channel, namely, the wave-like or respectively projecting and recessed portions of the meeting faces of the bands which lie in abutment and become tightly wedged together upon the lower part of the tire becoming compressed by being pressed downwardly by the weight of the vehicle. If preferred, the meeting faces of the tire bands may be arranged so that the said projecting and recessed parts may be annular or ring-shaped and concentric with each other as 16 in Fig. 5, but I ordinarily employ the radial construction illustrated.

These wave-like interlocking projections and recesses, together with the vulcanizing mentioned, comprise gripping devices to form protecting and supporting means to resist longitudinal movement or creeping, while resistance to slipping motion or skidding sidewise is afforded by the pockets or recesses and also by the transverse movement of the groove in becoming widened or opened whenever a tendency to slide occurs, thus constituting means to oppose such side motion. The channel sections may correspond in contour with the projecting portions and recesses of the tire bands as in Fig. 5 or they may have an even meeting face and formed so that the projecting portions of the bands may overlap the same as in Fig. 1. By the use of two continuous bands the strain at any given point of the tire is distributed, and the assemblage of the parts of the same, and removal for repairs, or the substitution of a new band member, is readily accomplished.

I may use, in addition to the vulcanization of the bases of my sectional or duplex tire to the channel rims, supplemental devices to hold the said base portions rigidly in operative position, as the vertical flanges or rings 17 which extend from the rim and which coöperate with the flanges 3 and 4 to serve as immediate supporting means for the tire members.

The said flanges 17 may however be dispensed with if desired, as the lowest ribs and grooves or immovable projecting and recessed abutting portions 10 and 11 of the tire members in coöperation with the vulcanization 7 of the bases thereof and the flanges 3 and 4, serve as attaching or holding means for the said bases to rigidly sustain the latter in operative position and to prevent any outward or endwise movement thereof on the rim. The function of the said lowest immovable abutting projections and recessed portions located at the bases of the tire members is therefore to coöperate with the flanges 3, 4 to rigidly and immovably hold the bases of the tire members permanently together at the channel rim.

The projecting and recessed portions of the two tire bands at the meeting faces thereof—both those radially and sidewise disposed as well as those vertically arranged in concentric annular form—serve to support each other by the frictional engagement of the two and thus to prevent undue and deleterious sudden movement of either one independent of the other as may happen where the said meeting faces are flat and parallel with each other and thereby allowing a sliding movement between the two at the peripheries thereof.

The surfaces of the streets of cities, as well as many roadbeds of country places, are inclined from 10 to 15 degrees. Consequently when a truck stands on such an incline, one of the pair of tire bands will be under considerably greater stress than the other one. In such a case—where the bands have flat and parallel meeting faces— if an unskilful or careless chauffeur starts the truck hastily, he will cause the tire band under the stress to bite into the roadbed on account of the sudden movement thereof, thereby disrupting or injuring the structure of, the said band which will slide along the parallel face of the other band (under less stress) at the periphery thereof.

Where, however, tire bands are employed under similar circumstances having projecting and recessed portions at their meeting faces, the tendency to sudden movement of the tire band under stress is checked by the frictional contact between the meeting faces of the two tire bands at the peripheries thereof and, by reason of the support thereby provided, the contact of the tread of the band under stress with the roadbed will be a more gradual one, thus obviating danger of injury to the structure of said tire band.

I wish it to be understood that I do not desire to be limited to the particular use or the exact details of construction shown and described, for obvious modifications will occur to persons skilled in the art.

What I claim as my invention is:—

1. In a vehicle equipped with a device of the class described, a plurality of separable tire members having tread portions, bases and a groove, and a channel rim, and having at the bases holding devices comprising immovable projecting and recessed abutting portions of the tire members and means for permanent attachment thereof to the rim in a rigid and stationary relation, the meeting faces of the tire members located adjacent to the tread being formed with movable projecting and recessed abutting portions.

2. In a device of the class described, a sectional tire comprising a plurality of interlocking resilient members each member having a rigid flanged support, a common sustaining device for, and attached to the latter, lateral movement of one member being limited on one side by the flange of said support and on the other by an interlocking abutting face of another of said members, and longitudinal movement of each member as an entirety being prevented by being vulcanized to its support and by frictional contact with the longitudinally disposed interlocking face of another of said members, and lateral and longitudinal movement of the flanged supports being prevented by the attachment of the same respectively to the common sustaining device.

3. In a device of the class described, a sectional tire having a tread and comprising a plurality of abutting resilient members each member having a rigid flanged support, the inner faces of said members having projecting and recessed abutting portions extending from the tread to the flanged support, a common sustaining device for, and attached to, the latter, lateral movement of one member being limited on one side by the flange of said support and on the other by an abutting face of another of said members, and longitudinal movement of each member as an entirety being prevented by being vulcanized to its support and by frictional contact with the longitudinally disposed abutting face of another of said members, and longitudinal and lateral movement of the flanged supports being prevented by the attachment of the same respectively to the common sustaining device.

4. A tire comprising a plurality of separable tire members having a tread portion, base and groove, a channel rim, the meeting faces of the tire members comprising movable projecting and recessed abutting portions located adjacent to the tread.

5. A tire comprising a plurality of separable tire members having a tread portion, base and groove, and a channel rim, the meeting faces of the tire members comprising respectively registering movable projecting and recessed portions located adjacent to the tread.

In testimony of the foregoing specification I do hereby sign the same in the city of New York, county and State of New York this 2nd day of April, 1918.

JONATHAN O. FOWLER.

Witnesses:
C. V. BERTSCHE,
C. HUBER.